(12) United States Patent
Fenney et al.

(10) Patent No.: US 7,161,594 B2
(45) Date of Patent: Jan. 9, 2007

(54) METHOD AND APPARATUS FOR COMPRESSED DATA STORAGE AND RETRIEVAL

(75) Inventors: Simon Fenney, Herts (GB); Mark Butler, Bedfordshire (GB)

(73) Assignee: Imagination Technologies Limited, Hertfordshire (GB)

( * ) Notice: Subject to any disclaimer, the term of this patent is extended or adjusted under 35 U.S.C. 154(b) by 305 days.

(21) Appl. No.: 10/621,111

(22) Filed: Jul. 16, 2003

(65) Prior Publication Data
US 2005/0044117 A1    Feb. 24, 2005

(30) Foreign Application Priority Data
Jul. 17, 2002   (GB) ................... 0216668.4

(51) Int. Cl.
*G06T 15/00* (2006.01)
(52) U.S. Cl. ............. 345/419; 345/420; 345/427; 382/232
(58) Field of Classification Search ............ 345/419, 345/420, 427; 382/232
See application file for complete search history.

(56) References Cited

U.S. PATENT DOCUMENTS 5,949,424 A   9/1999  Cabral et al.

6,204,854 B1  3/2001  Signes et al.
6,337,684 B1  1/2002  Dyer et al.

FOREIGN PATENT DOCUMENTS

| EP | 1 004 0940 B1 | 10/2002 |
| WO | WO 95/27268 | 10/1995 |
| WO | WO 99/09523 | 2/1999 |

OTHER PUBLICATIONS

Blinn, James F.; "Simulation of Wrinkled Surfaces", SIGGRAPH 1978, pp. 286-292.
Peercy, Mark, et al; "Efficient Bump Mapping Hardware", SIGGRAPH 1997, pp. 303-306.
United Kingdom Patent Office Examination Report dated Mar. 16, 2005 (1 page).
International Preliminary Examining Authority Written Opinion (7 pages).
International Search Report dated Nov. 6, 2003, (4 pages).
Jeong-Hwan Ahn et al: "An efficient geometry compression method for 3D objects in the spherical coordinate system", Image Processing, Oct. 24, 1999 (Abstract 1 page).

*Primary Examiner*—Kimbinh T. Nguyen
(74) *Attorney, Agent, or Firm*—Flynn, Thiel, Boutell & Tanis, P.C.

(57) ABSTRACT

Method and apparatus are provided for compressing and decompressing data representing a 3D unit vector. X, Y, and Z components are derived from the vector data and a determination made as to the octant in which that vector falls from a number of possible octant pairs. The vector is then scaled with a scaling factor and compressed data values are derived from the octant pair data and scaled vector data.

6 Claims, 4 Drawing Sheets

METHOD AND APPARATUS FOR COMPRESSED DATA STORAGE AND RETRIEVAL

This invention relates to a method and apparatus for compressing and decompressing data. Embodiments of the invention are particularly useful in computer graphics systems and in particular in a computer graphics systems of the type which are useful in the field of 3D computer graphics and for applying detail to otherwise smooth surfaces through use of a 'bump mapping' algorithms, such as those which store per-pixel surface normals in a texture.

The concept of bump mapping was introduced in "Simulation of Wrinkled Surfaces" (SIGGRAPH 1978, pp286–292) by Blinn. The computed shading of surfaces, which is typically done using a function of the incoming directions of light rays and a surface normal, i.e. a vector perpendicular to the surface at a given point, gives important clues as to the orientation and also roughness of that surface. Blinn's bump mapping gabve otherwise mathematically smooth surfaces the appearance of roughness (or bumps) due to changes in the shading caused by altering the computed surface normal on a per-pixel basis. The method uses texture mapping to obtain a perturbation vector to modify a surface's interpolated-per-pixel normal.

In "Efficient Bump Mapping Hardware", (SIGGRAPH 1997, pp303–306, and U.S. Pat. No. 5,949,424) Peercy et al devised a more efficient method that directly stored 'perturbed' normal vectors in the texture data. These normals were defined relative to a localized tangent coordinate system. Each light vector had to be expressed in coordinates relative to the local tangent space coordinate system.

Because both the size of textures and the memory bandwidth consumed during texturing are important factors in computer graphics, European Patent EP 1004094 describes a process to reduce the storage costs of the surface normal from three coordinate values (XYZ), to just two values thus saving storage space and texturing bandwidth. This method takes advantage of the fact that the surface normals are unit vectors defined in the local surface coordinate space. As shown in FIG. 1a, the unit normals are primarily restricted to lie in a single hemisphere.

As an alternative to the local tangent space system, the surface normal direction can be defined in the object's local coordinate space. Although this has the disadvantage that it is difficult to reuse portions of the bump texture for different areas of objects, it has the advantage that it is cheaper to compute the interpolated lighting vectors and that there is no need to store per-vertex local tangent coordinate systems in the model. For example, the technique in WO9527268 starts with this approach but then uses vector quantisation to make bump map shading fast.

With the local coordinate space method, one can note that the surface normal directions are now arbitrarily distributed in all directions across the surface of a sphere of unit radius (see FIG. 1b), unlike the local tangent space system where they are generally spread over one hemisphere. Although the method of surface normal compression described in EP 1004094 can be extended by using an additional bit to choose between the hemispheres, this is not ideal, as many of the possible data encoding patterns are wasted.

Although not intended for storage in bump map textures, "Geometry Compression", SIGGRAPH 1995, pp 13–20 by Deering describes a method for compressing a 3D unit vector into 18 bits by identifying six regions in every octant of the unit-radius sphere. Unfortunately, 18 bits is an inconvenient size for texture storage in a computer-texturing device where the preferred size is typically 8 or 16 bits. Although it may be possible to reduce some of the precision of this method so that it does fit into, say, 16 bits, the method requires numerous tests as well as fairly expensive trigonometric functions. Because a contemporary 3D texturing system needs to be able to compute in the order of a billion texturing operations per second, it is important that these decompression operations are relatively cheap.

Preferred embodiments of the present invention provide a method and apparatus for storing 3D unit vectors in a form that is both optimized for storage in a texture, and for ease of decompression in the texturing and shading engine of a computer 3D graphics system. They are capable of supporting both the local tangent space and the local coordinate space methods of representing surface normals. Finally, the preferred methods make more efficient use of the representative bits than that presented in EP 1004094.

The invention is defined with more precision in the appended claims to which reference should now be made.

Embodiments of the invention will now be described in detail, by way of example, with reference to the attached figures in which.

One embodiment of the invention has two main aspects. Firstly it is able to represent 3D vectors, chosen from a set of points on a unit radius sphere, in a compressed binary encoded format suitable for storage in computer memory. Secondly it is able to convert the compressed format back into 3D unit vectors. As the clearest way of describing the embodiment of the invention is to illustrate the decompression process, this will be the approach taken.

Figure 1A:
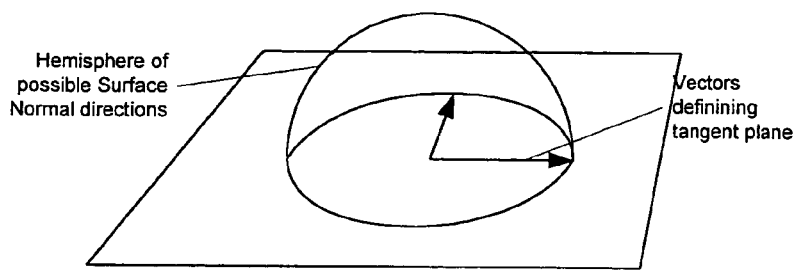
FIG. 1a illustrates the range of unit normals needed for the tangent space bump mapping method.
Figure 1B:
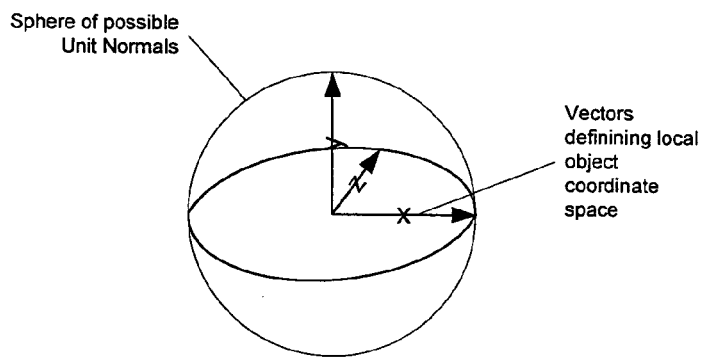
FIG. 1b shows the larger range required for the local coordinate space method.
Figure 1C:
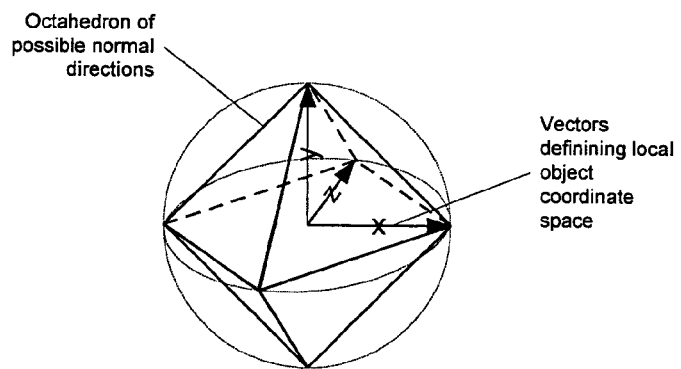
FIG. 1c shows the range compressed onto a regular octahedron.

The spherical surface of possible unit vectors (e.g. FIG. 1b) is 'collapsed' into a regular octahedron (FIG. 1c). This is divided into octants and then those are paired to form four 'octant pairs'. In the preferred embodiment, these pairs are chosen so that all vectors in an 'octant pair' have the same sign for their X components and similarly the same sign for their Y components. The sign of the Z component distinguishes which octant of the pair the vector is in. An encoded value thus identifies which 'octant pair' the vector lies in and then two values, U and V, are used to locate the vector inside the 'octant pair' region. These U and V values can be considered to be an encoding of values in the range of [0 . . . 1].

Figure 2:
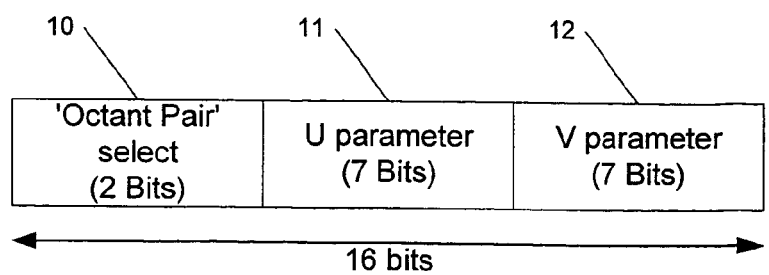
FIG. 2 shows the preferred assignment of bits to a 16 bit encoding of a unit vector in an embodiment of the invention.

In the preferred embodiment, each 3D unit vector is encoded as a 16-bit value, as shown in FIG. 2, Each value consists of 3 fields: the 2-bit 'octant pair identifier' 10, a 7-bit U parameter 11, and a 7-bit V parameter 12. Other choices of numbers of bits for the U and V parameters can be selected.

There is a decompression apparatus. The 'octant pair identifier', 10, is supplied to a decode unit, 20. This interprets the input values to produce a pair of numerical sign flags that will be applied to X and y components for the decoded vector. The 'Add and Test Magnitude' unit, 21, adds together the U and V values, 11 and 12, and compares the sum with 127 (which is equivalent to a value of logical value of '1.0' and is half the maximum possible value of the sum of 7-bit U and V values). It outputs both the result of the sum and a flag based on the result to indicate whether the sum is above 127. The flag is then used to determine in which of the two octants in the 'octant pair' the vector is located.

Assignment unit 22 takes the pair of sign bits from 20 and the magnitude comparison result from unit 21, and combines them with the original U and V values, 11 and 12, to produce a vector, {X' Y' Z'}. This vector is in the same direction as the normal vector but is not of unit length. Unit 23 computes the reciprocal of the length of the vector {X' Y' Z'}, and passes this to a scaling unit, 24. This then scales the vector using the reciprocal to produce a unit vector result, 25.

The internal operation of these various units will now be described using a C-like pseudo-code notation.

Unit 20, products two sign flags, Xsign and Ysign, based on the 'octant pair' identifier, 10, OPI. This is trivial operation in hardware and is described by the following code:

```
#define IS_POS (0)
#define IS_NEG (1)
switch (OPI)
{
    case "00":
        Xsign = IS_POS;
        Ysign = IS_POS;
        break;
    case "01":
        Xsign = IS_POS;
        Ysign = IS_NEG;
        break;
    case "10":
        Xsign = IS_NEG;
        Ysign = IS_POS;
        break;
    case "11":
        Xsign = IS_NEG;
        Ysign = IS_NEG;
        break;
};
```

The Xsign and Ysign flags are used to indicate whether the values X and Y will be positive or negative.

Unit 21, produces the sum of U & V and a single bit flag, WO, to identify to which octant of a pair of octants the data belongs. This can be described as:

```
UVSum = u+v;
If(UVSum < 128)
{
    Octant = 0;
}
else
{
    Octant = 1;
}
```

Those skilled in the art will appreciate that in hardware, given the range of the input parameters, i.e., [0 . . . 127] in the preferred embodiment, the comparison and assignment amount to selecting the top bit of the sum of the u and v values range of [0 . . . 254].

Unit 22 produces the initial, non-unit-length vector as follows:

```
If(Octant==0)
{
    X' = U;
    Y' = V;
}
Else
{
    X' = 127 – V; /*Note swap of U and V*
    Y' = 127 – U;
}
Z' = 127 – (UVSum);
If (Xsign == IS_NEG)
{
    X' = –X';
}
if(Ysign == IS_NEG)
{
    Y' = –Y';
}
```

In the preferred embodiment, the X' and Y' values use signed-magnitude format (rather than two complement) so that the negation and the subsequent computation of the square of the length of the [X', Y', Z'] vector is cheaper.

Unit 23 computes the reciprocal of the length of the initial vector as a pseudo floating-point binary number. It initially computes the square of the length of the vector by summing the squares of the components, i.e.

$$LengthSQ = X'^{*}X' + Y'^{*}Y' + Z'^{*}Z';$$

It will be appreciated that, due to the range of input values and the calculations performed, the possible range of squared lengths is limited. In the preferred embodiment, this range is 5377 to 16129 inclusive and thus can be represented with 14 bits.

The reciprocal of the square root of this squared length is then computed in a pseudo-floating point format, using any method known in the art. In the preferred embodiment, this calculation can be done using a normalizing shifter, 50, to shift the input an even number of bits to the left of which the 10 top most bits will be selected. Note that the most significant '1' bit is in either bit of the two most significant locations. The 10 bit result, 51, effectively represents a fixed point number in the range [256,1023], and is then used to access a lookup table, 52. The lookup table returns an 11bit fixed point result in the range ($1023^{-0.5}$, $\frac{1}{16}$) corresponding to the reciprocal of the square root of the input to 52 multiplied by a suitable power of two.

This result re-combined with the normalizing shift amount divided by two, 53, added to an additional shift, 54, then constitutes the reciprocal square root of the original squared sum in a pseudo floating point form. The additional shift value, in the example embodiment, is 8. The value is chosen to allow for the magnitude of the results, the number of significant bits to be output from the look up table, and the number of bits of precision required for the final normalized vector.

Finally, Unit 24 just multiplies the pseudo floating point value (i.e. corresponding to a multiply followed by shifts and truncates) by each of the X', Y', and Z' components to obtain the normalized result representing signed 8 bit fixed point values in the range [−1,1] with 7 fractional bits.

Figure 3:
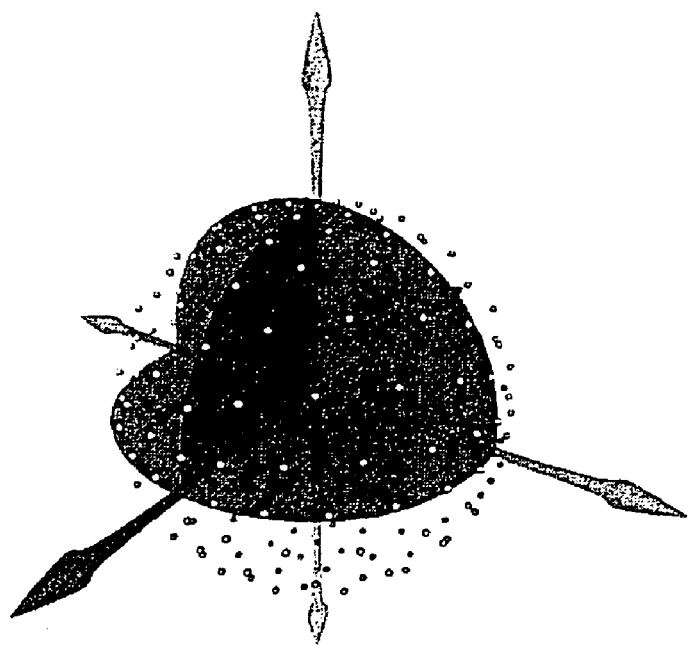
FIG. 3 illustrates the distribution of possible normal locations which can be represented in an embodiment of the present invention using two 3-bit values.
Figure 4:
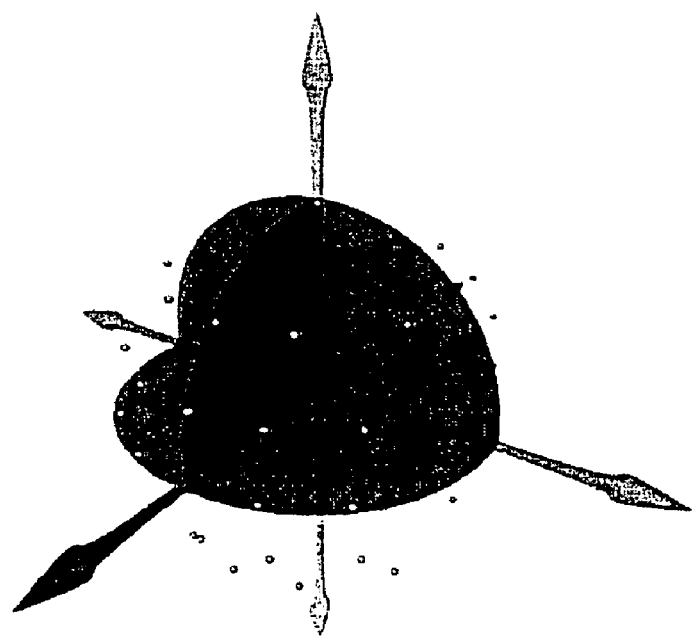
FIG. 4 illustrates the distribution of possible normal locations for a known method of data compression and retrieval using an approximately equal number of storage bits to that used for the embodiment of the invention whose distribution is illustrated in FIG. 3.

For illustrative purposes, FIG. 3 displays the distribution of normal locations for an example embodiment where U and V are only assigned 3 bits each. As a comparison, FIG. 4 shows the distribution of points for the adapted version of the method described previously in European Patent 1004094, using an approximately equivalent number of storage bits. As can be seen, the storage is not as even, nor as dense.

Figure 5:
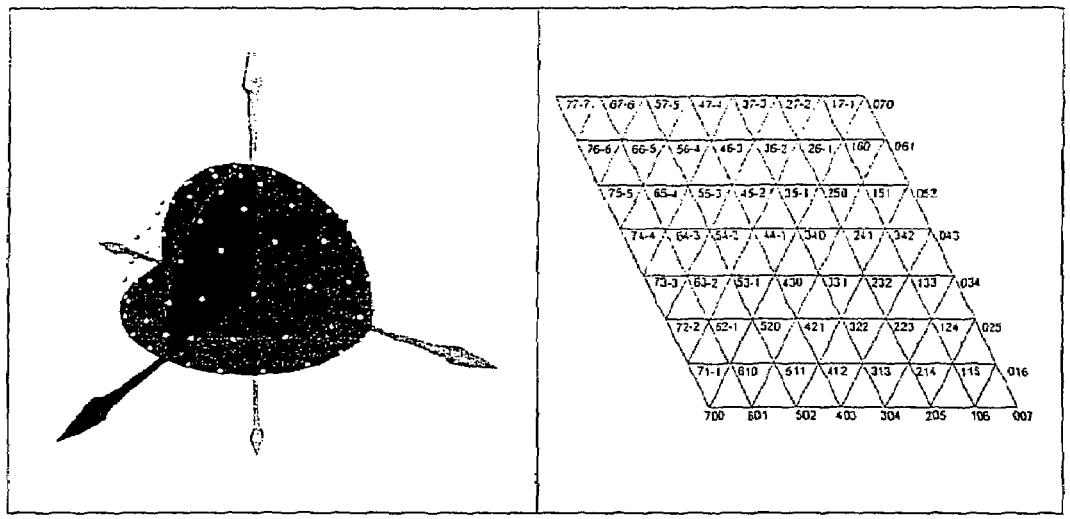
FIG. 5 illustrates the distribution of FIG. 3 for just one octant pair of the sphere together with the corresponding grid of 3-bit values.

FIG. 5 shows the distribution for just one octant pair of the sphere with the corresponding grid of U and V values.

Figure 6:
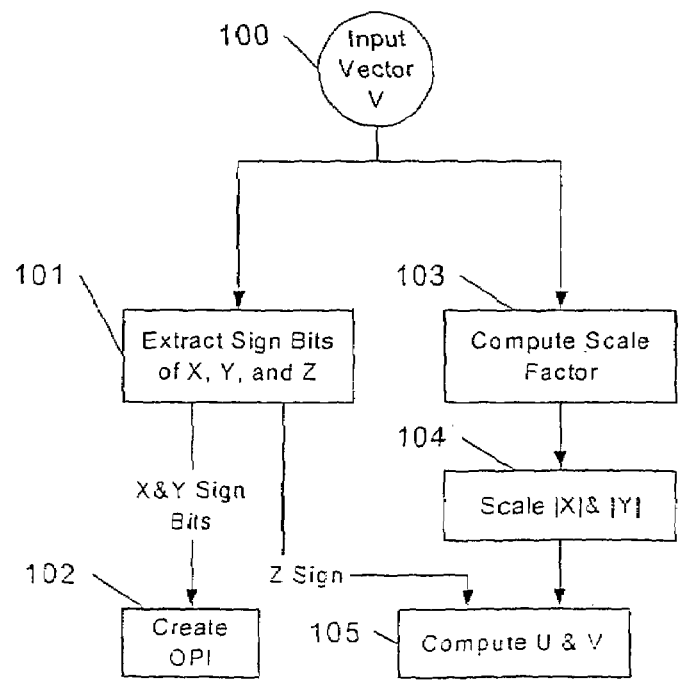
FIG. 6 illustrates a compression apparatus for converting a 3D vector to an 'equivalent' packed form.
Figure 7:
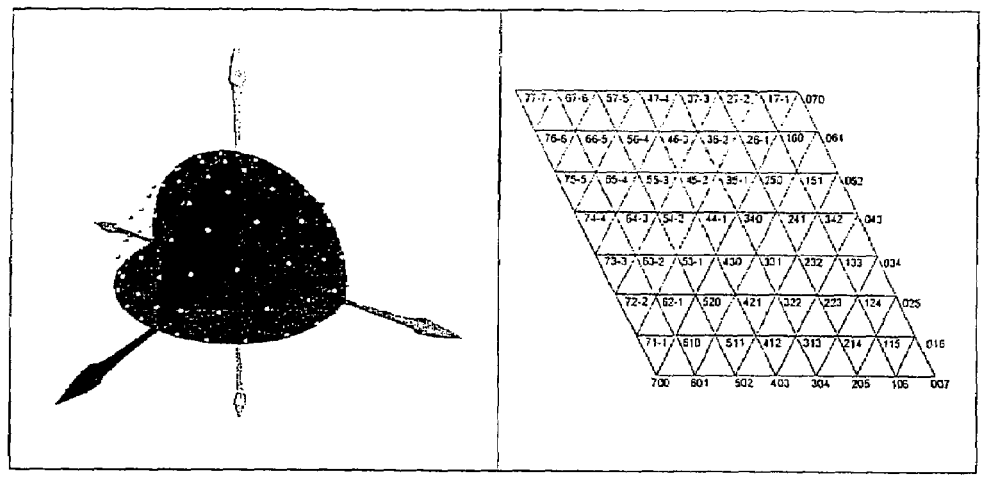
Figure 8:
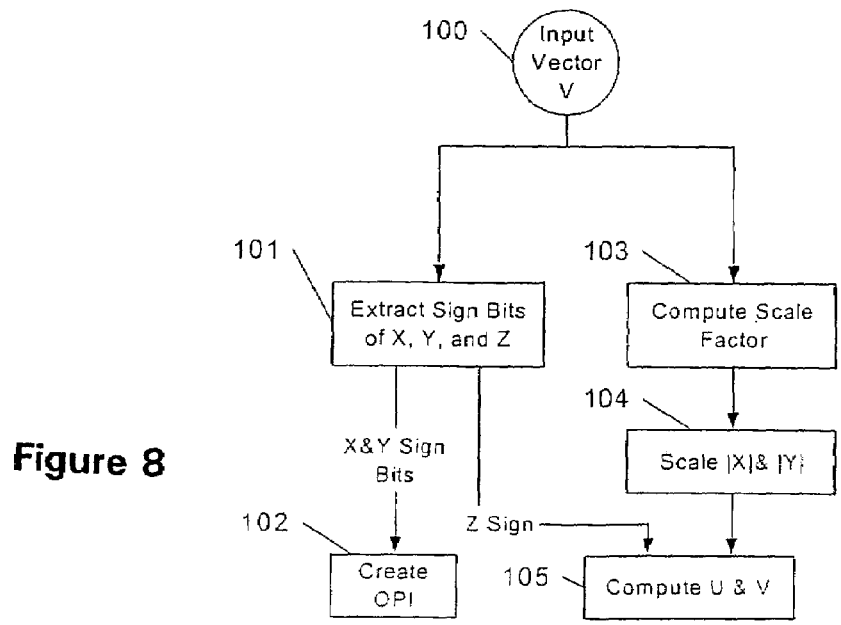

The opposite of the decompression process, i.e. compression, is essentially the described process run in reverse. This will be described with reference to FIG. 6. A (preferably) unit vector, V, 100, is analysed, 101, and the signs of the X, Y, Z components extracted to determine which octant the unit vector lies in. The signs of the X and Y components are used to construct the OPI encoding, 102. A scaling factor for the vector is computed, 103, so that V1[Z]=127V1[X]−V1[Y]. The scaling factor is applied to the X and Y values, 104. Given the sign of the Z component. The U and V components are then computed from the scaled X and Y values, 105.

Due to rounding/truncation approximations in the decompression process, it is possible that a 'closer' match can be found by trying some of the 'neighbouring' encodings. This procedure is described by the following 'C' code:

```
void EncodeNormal(const float Norm[3],
    int *pU, int *pV, int *pOPI)
{
    int OPI;
    float x, y, z;
    float BestError, AngleError;
    int InitialU, InitialV, BestU, BestV, Ui, Vi;
    float scale;
    float PackedNorm[3];
    if(Norm[1] < 0.0)
    {
        OPI = 0x1;
    }
    else
    {
        OPI = 0x0;
    }
    if(Norm[0] < 0.0)
    {
        OPI |= 0x2;
    }
    // Return the OPI encoding.
    *pOPI = OPI;
    x = fabs (Norm[0]);
    y = fabs (Norm[1]);
    z = Norm[2];
    scale = 127 / (fabs(z) + x + y);
    x *= scale;
    y *= scale;
    /*
    // Compute initial integer U & V values
    // (Taking z sign into account)
        */
    if(z < 0)
    {
    InitialU = (int) floor(127 − y);
    InitialV = (int) floor(127 − x);
    }
    else
    {
    InitialU = (int) floor(x);
    InitialV = (int) floor(y);
    }
    /*
    // Try a neighbourhood of U and V values.
    */
    BestError = FLT_MAX;
        for(Ui = MAX(InitialU−1, 0);
        Ui < MIN(InitialU +3, 127); Ui++)
    {
        for(Vi = MAX(InitialV−1, 0);
        Vi < MIN(InitialV +3, 127); Vi++)
    {
        // Compute normal from the trial U,V and OPI
        DecodeNorm(Ui, Vi, OPI, PackedNorm);
        AngleError = MeasureAngle(Norm, PackedNorm);
        If(AngleError < BestError)
        {
        BestError = AngleError;
        BestU = Ui;
        BestV = Vi;
            }
        }/*end for Vi*/
    }/*end for Ui*/
    /*
    // Return the results
    */
    *pU = BestU;
    *pV = BestV;
}
```

The 'MeasureAngle' routine can be computed either by computing the angle exactly, i.e.,

```
double MeasureAngle(const float Vec1[3],
                    const float Vec2[3])
{
    return acos(DP(Vec1, Vec2) / sqrt(DP(Vec1, Vec1) *
    DP(Vec2, Vec2)));
}
...or more cheaply as this simpler metric...
double MeasureAngle(const float Bvec1[3],
    const float Vec2[3])
{
    return fabs(1.0 − DP(Vec1, Vec2) / sqrt (DP(Vec1,
    Vec1) *
    DP(Vec1, Vec2)));
}
The DP function computes the usual dot product, i.e... .
double DP(const float A[3], const float B[3])
{
    return A[0]*B[0] + A[1]*B[1] + A[2]*B[2];
}
```

It should be noted that this technique is also useful for applications other than bump mapping which require reduced cost storage of unit vectors. The compression of vertex geometry, as described by Deering, is one such application.

The invention claimed is:

1. A method for compressing data representing a 3D unit vector, comprising the steps of:
   a) determining X, Y, and Z components of the vector;
   b) determining in which octant the vector falls;
   c) deriving octant pair data from signs of the X and Y components of the vector;
   d) deriving a scaling factor for the vector;
   e) scaling the X and Y components with the scaling factor; and
   f) deriving compressed data values to represent the vector and the octant of an octant pair in which the vector falls, with the vector being encoded as compressed data values and octant pair data.

2. The method for compressing data representing a 3D unit vector according to claim in which the compressed data values are derived from the octant pair data and the scaled X and Y components in combination with a sign of the Z component.

3. An apparatus for compressing data representing a 3D unit vector, comprising:
   a) means for determining X, Y and Z components of the vector;
   b) means for determining in which octant of four octant pairs the vector falls;
   c) means for deriving octant pair data from signs of the X and Y components of the vector;
   d) means for deriving a scaling factor for the vector;
   e) means for scaling the X and Y components of the vector with the scaling factor; and
   f) means for deriving compressed data values to represent the vector and the octant of the octant pair in which the vector falls, with the vector being encoded as compressed data values and octant pair data.

4. The apparatus for compressing data representing a 3D unit vector according to claim 3 in which the compressed data values are derived from the octant pair data and the scaled X and Y components in combination with a sign of the Z component.

5. A method for decompressing data representing a 3D unit vector from compressed data comprising three fields, the method comprising the steps of:
   a) identifying one of four octant pairs from octant pair data stored in a first field;
   b) extracting first and second data values from second and third fields;
   c) determining from the first and second data values the octant of an identified octant pair in which the vector falls;
   d) deriving X, Y and Z components from the first and second data values and the octant pair data; and
   e) normalizing the X, Y, and Z components to derive a unit vector.

6. An apparatus for decompressing data representing a 3D unit vector from compressed data of three fields, the apparatus comprising:
   a) means for identifying one of four octant pairs from octant pair data stored in a first field;
   b) means for extracting first and second data values from second and third fields, respectively;
   c) means for determining, from the first and second data values, the octant of an identified octant pair in which the vector falls;
   d) means for deriving X, Y and Z components from the first and second data values; and
   e) means for normalizing the X, Y and Z components to derive a unit vector.

* * * * *